United States Patent [19]

Takano

[11] Patent Number: 4,634,404

[45] Date of Patent: Jan. 6, 1987

[54] METHOD OF CONTROLLING ROTATION OF A V-BELT DRIVE

[75] Inventor: Hiroshi Takano, Miki, Japan

[73] Assignee: Mitsuboshi Belting Ltd., Kobe, Japan

[21] Appl. No.: 730,945

[22] Filed: May 6, 1985

[51] Int. Cl.[4] ............................................. F16H 11/06
[52] U.S. Cl. ......................................... 474/11; 74/866
[58] Field of Search ................ 474/11, 12, 18; 74/866

[56] References Cited

U.S. PATENT DOCUMENTS

| 3,735,167 | 5/1973 | Wickersheimer | 474/11 X |
| 4,357,806 | 11/1982 | Harris et al. | 474/11 X |
| 4,462,275 | 7/1984 | Mohl et al. | 74/866 |
| 4,509,125 | 4/1985 | Fattic et al. | 474/11 X |

Primary Examiner—James A. Leppink
Assistant Examiner—Frank H. McKenzie, Jr.
Attorney, Agent, or Firm—Wood, Dalton, Phillips, Mason & Rowe

[57] ABSTRACT

A method of controlling the speed of the output of a V-belt drive having an output driven pulley driven by a V-belt from an input driver pulley wherein the rotational speed of the driver pulley is determined, the ratio of the effective belt drive diameters of the driver and driven pulleys are determined and the effective belt to drive diameter of at least one of the pulleys is adjusted to provide a preselected speed of the drive output.

25 Claims, 9 Drawing Figures

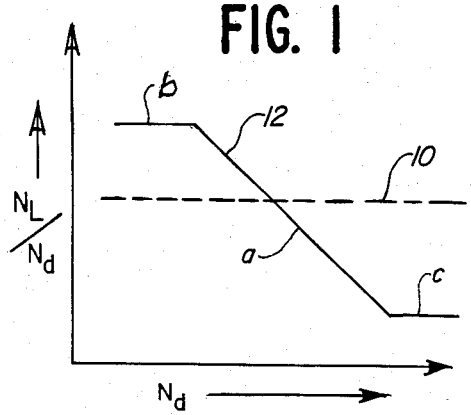
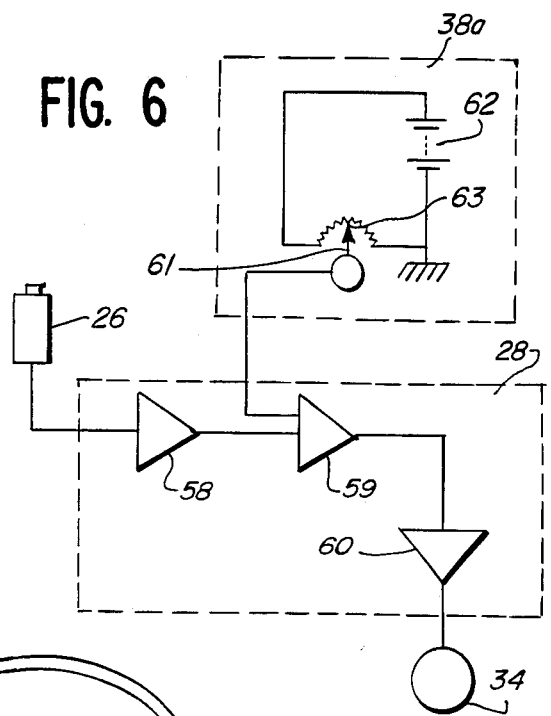
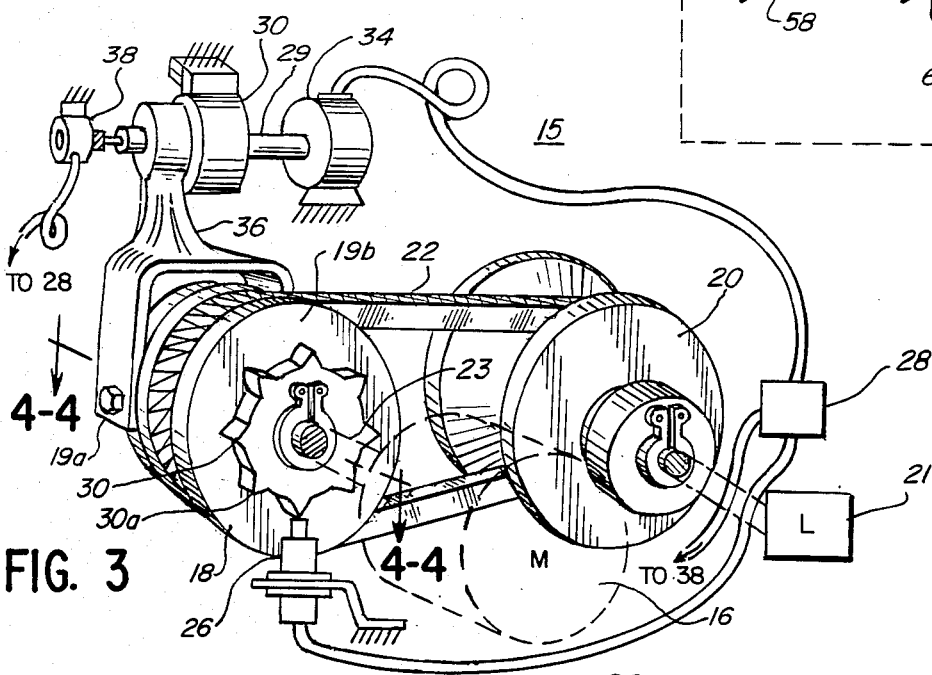
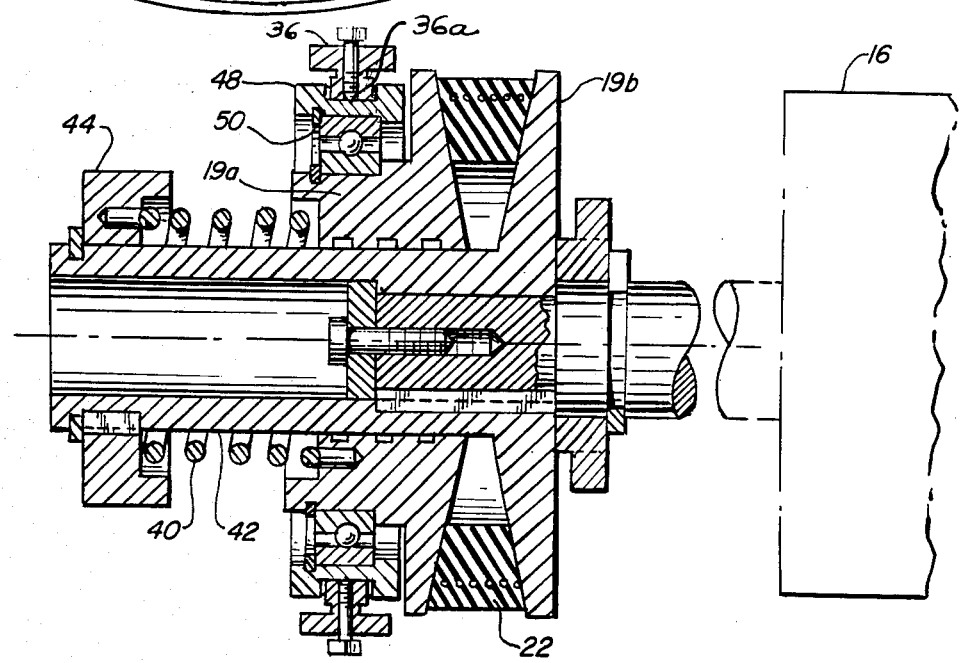

FIG. 2
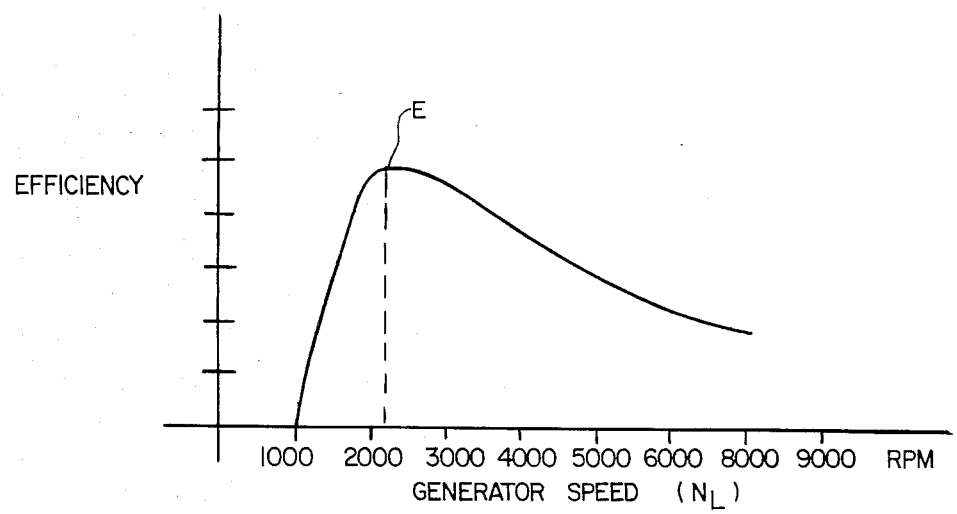
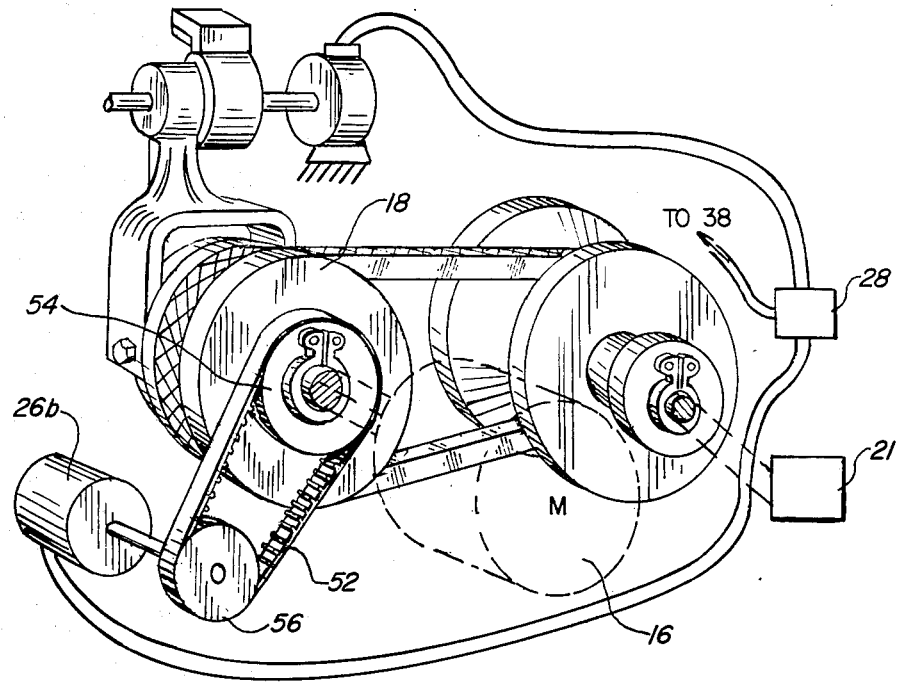
FIG. 5

METHOD OF CONTROLLING ROTATION OF A V-BELT DRIVE

BACKGROUND OF THE INVENTION

1. Field of the Invention

The present invention relates to V-Belt drives and more particularly to a method of controlling the speed of a driven shaft not withstanding variations in the speed of a driver shaft.

2. Description of Background Art

A V-Belt power transmission drive including a driver pulley, a driven pulley and a V-belt interconnecting the pulleys is a common method of transmitting torque from a prime mover to a load. While the angular velocity i.e., rotational speed, of the driven pulley is normally not equal to the rotational speed of the driver pulley, as determined by the ratio of the circumference of the driven pulley to the circumference of the driver pulley, the speed of the driven pulley is normally directly proportional to the speed of the drive pulley.

One use of such V-belt drives is in driving the generator of a vehicle. Such generators conventionally have optimal operating speeds. The generator is driven from the automobile engine, the speed of which varies, so that the speed of the generator correspondingly varies.

Therefore, in such operation of the vehicle, the generator may not be operating at the optimal speed at all times and must be designed to operate over a wide range of driven speeds.

In other applications incorporating V-belt transmissions, the prime mover has a speed-versus-torque relationship different from the speed-versus-torque relationship of the load. Where the speed of the load is caused to be directly proportional to the speed of the prime mover, the prime mover must be sufficiently oversized to permit the torque output of the prime mover at any speed to satisfy the torque requirement of the load at the operating speed thereof. Such oversizing is undesirable for economic concerns, space requirements, ease of maintenance, etc.

SUMMARY OF THE INVENTION

The present invention comprehends a method of controlling the speed of rotation of a load driven by a drive system including a driver pulley, a driven pulley and a V-belt engaged therebetween.

In the illustrated embodiment, one or both of the pulleys comprises a variable diameter pulley and include illustratively a movable pulley piece movable with respect to a stationary pulley piece. As the movable pulley piece is adjusted in relation to the stationary pulley piece, the effective diameter of the variable diameter pulley changes, thereby changing the ratio between the driver pulley and the driven pulley.

In the illustrated embodiment, the engine is directly connected to the driver pulley. The driven pulley is directly connected to a load, an automotive generator having a preselected speed-versus-torque relationship. A V-belt interconnects the driver pulley to the driven pulley.

The rotational speed of the driver pulley is sensed and a corresponding speed signal is generated. The position of the movable pulley piece of the variable diameter pulley is adjusted in accordance with the speed signal, thereby modulating the effective diameter of the variable diameter pulley in accordance with the load requirements. The invention comprehends an improved method of controlling this function.

BRIEF DESCRIPTION OF THE DRAWINGS

Other features and advantages of the invention will be apparent from the following description taken in connection with the drawings, wherein:

FIG. 1 is a graph illustrating the relationship between the rotational speed of the driver pulley and the driven pulley, for both a conventional V-belt power transmission drive and a V-belt power transmission drive incorporating the present invention;

FIG. 2 is a graph illustrating the relationship between the rotational speed of a generator and the operating efficiency of the generator;

FIG. 3 is a schematic perspective view of a drive system embodying the present invention;

FIG. 4 is a diametric section taken substantially along the line 4—4 of FIG. 3 illustrating the variable diameter driver pulley;

FIG. 5 is a schematic perspective view similar to that of FIG. 2, but illustrating a drive system utilizing a different method of sensing the driver pulley speed;

FIG. 6 is a schematic diagram of the electric control utilized in the prevent invention;

DESCRIPTION OF THE PREFERRED EMBODIMENT

Figure 7:
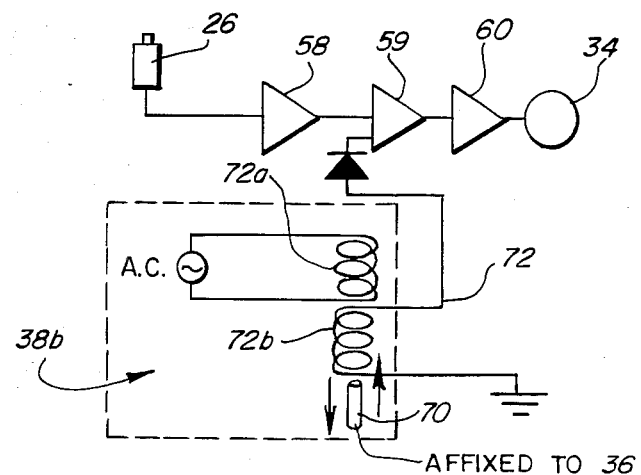
FIG. 7 is a schematic diagram illustrating another electric control system useful in practicing the invention.
Figure 8:
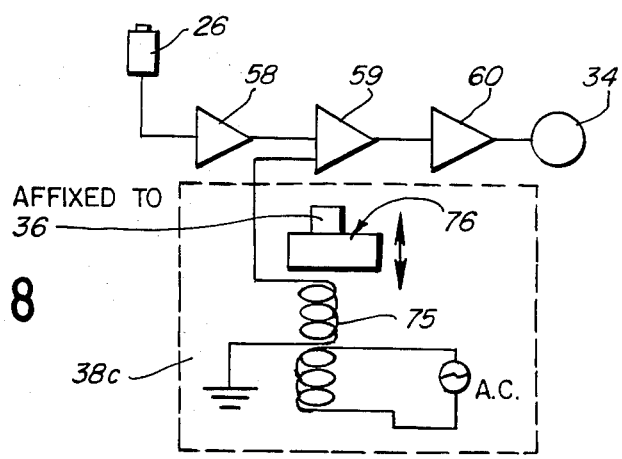
FIG. 8 is a schematic diagram illustrating still another electric control system useful in practicing the invention; and, FIG. 9 is a schematic diagram illustrating yet another electric control system useful in practicing the invention.
Figure 9:
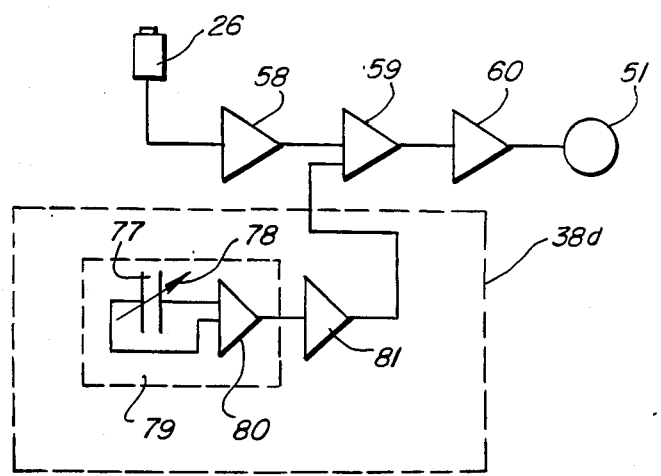

A V-belt power transmission drive 15 includes a driver pulley 18 connected to a prime mover engine 16, a load or driven pulley 20 connected to a rotating load 21 and a V-belt 22 engaged therebetween.

FIG. 1 compares the relationship between the angular velocity, or rotational speed $N_d$ of the driver pulley 18, versus the ratio of the driven pulley speed $N_L$ to the driver pulley speed $N_d$ for a V-belt power transmission drive, embodying the invention with the prior art V-belt drives.

A first curve 10 illustrates the relationship between the driver pulley speed ($N_d$) and the ratio of driven pulley speed to drive pulley speed ($N_L/N_d$) for a conventional V-belt power transmission drive. For any driver pulley speed ($N_d$), the ratio of driven pulley speed to driver pulley speed, ($N_L/N_d$) remains constant. Thus, as $N_d$ increases, $N_L$ increases proportionately.

A second curve 12, including segments a, b, and c, illustrates the relationship between the drive pulley speed ($N_d$) and the ratio of driven pulley speed to driver pulley speed ($N_L/N_d$) for a V-belt power transmission drive incorporating the present invention. Segment "a" of curve 12 illustrates the speed wherein the ratio of driven pulley speed to driver pulley speed decreases linearly as the driver pulley speed increases, i.e., the driven pulley speed remains constant over this range of driver pulley speeds.

The segments "b" and "c" of the second curve 12 illustrate the ranges of driver pulley speeds beyond the maximum limits of adjustment of the driver pulley diameter.

determining the instantaneous effective belt diameter of the driver pulley;

determining the ratio of the effective belt drive diameters of the driver and driven pulleys; and adjusting the effective belt drive diameter of at least one of the pulleys to provide a preselected speed of the drive output.

2. The method of controlling the speed of the output of a V-belt drive of claim 1 wherein said step of adjusting the effective belt diameter comprises a step of adjusting the effective belt drive diameter of the driver pulley.

3. The method of controlling the speed of the output of a V-belt drive of claim 1 wherein said driver pulley comprises a split pulley having a pair of coaxial axially variably spaced pulley pieces defining an adjustable diameter V-belt groove receiving the V-belt.

4. The method of controlling the speed of the output of a V-belt drive of claim 1 wherein said driver pulley comprises a split pulley having a pair of coaxial axially variably spaced pulley pieces defining an adjustable diameter V-belt groove receiving the V-belt and said step of adjusting the effective belt drive diameter comprises a step of adjusting the effective belt drive diameter of the driver pulley by adjusting the axial spacing of the pulley pieces.

5. The method of controlling the speed of the output of a V-belt drive of claim 1 wherein the step of determining the rotational speed of the driver pulley comprises a step of providing a pulse generator driven by the driver pulley and sensing the rate of pulse generation thereby.

6. The method of controlling the speed of the output of a V-belt drive of claim 1 wherein the step of determining the rotational speed of the driver pulley comprises a step of driving a tachometer in correspondence with the speed of the driver pulley.

7. The method of controlling the speed of the output of a V-belt drive having an output driven pulley driven by a V-belt from an input driver pulley comprising a split pulley having a pair of coaxial, axially variably spaced pulley pieces defining an adjustable diameter V-belt groove receiving the V-belt, said method comprising the steps of:

determining the rotational speed of the driver pulley;

sensing the axial spacing between the driver pulley pieces to determine the effective belt drive diameter of the driver pulley;

determining the ratio of the effective belt drive diameters of the driver and driven pulleys; and adjusting said axial spacing between said pulley pieces to adjust the effective belt drive diameter of the driver pulley to provide a preselected speed of the drive output.

8. The method of controlling the speed of the output of a V-belt drive of claim 7 wherein said step of adjusting said axially spacing includes a step of comparing the determined rotational speed of the driver pulley with a reference signal and providing a comparison signal for controlling said adjustment.

9. The method of controlling the speed of the output of a V-belt drive of claim 7 wherein said step of determining the rotational speed of the driver pulley comprises a step of providing a speed voltage signal proportional thereto, and said step of adjusting said axial spacing includes a step of comparing said voltage signal with a reference voltage signal corresponding to said axial spacing, and providing a comparison signal for controlling said adjustment.

10. The method of controlling the speed of the output of a V-belt drive of claim 7 wherein said step of determining the rotational speed of the driver pulley comprises a step of providing a speed voltage signal proportional thereto, and said step of adjusting said axial spacing includes a step of comparing said voltage signal with an adjustable reference voltage signal corresponding to said axial spacing, and providing a comparison signal for controlling said adjustment.

11. The method of controlling the speed of the output of a V-belt drive of claim 7 wherein said step of determining the rotational speed of the driver pulley comprises a step of providing a speed voltage signal proportional thereto, and said step of adjusting said axial spacing includes a step of comparing said voltage signal with an adjustable reference voltage signal corresponding to said axial spacing produced by a variable potentiometer, and providing a comparison signal for controlling said adjustment.

12. The method of controlling the speed of the output of a V-belt drive of claim 7 wherein said step of determining the rotational speed of the driver pulley comprises a step of providing a speed voltage signal proportional thereto, and said step of adjusting said axial spacing includes a step of comparing said voltage signal with an adjustable reference voltage signal corresponding to said axial spacing produced by a differential transformer, and providing a comparison signal for controlling said adjustment.

13. The method of controlling the speed of the output of a V-belt drive of claim 7 wherein said step of determining the rotational speed of the driver pulley comprises a step of providing a speed voltage signal proportional thereto, and said step of adjusting said axial spacing includes a step of comparing said voltage signal with an adjustable reference voltage signal corresponding to said axial spacing produced by a differential transformer having a core adjustably positioned in accordance with said axial spacing, and providing a comparison signal for controlling said adjustment.

14. The method of controlling the speed of the output of a V-belt drive of claim 7 wherein said step of determining the rotational speed of the driver pulley comprises a step of providing a speed voltage signal proportional thereto, and said step of adjusting said axial spacing includes a step of comparing said voltage signal with an adjustable reference voltage signal corresponding to said axial spacing produced by a differential transformer having a magnetic plate adjustably positioned in accordance with said axial spacing, and providing a comparison signal for controlling said adjustment.

15. The method of controlling the speed of the output of a V-belt drive of claim 7 wherein said step of determining the rotational speed of the driver pulley comprises a step of providing a speed voltage signal proportional thereto, and said step of adjusting said axial spacing includes a step of comparing said voltage signal with an adjustable reference voltage signal corresponding to said axial spacing produced by a variable capacitor, and providing a comparison signal for controlling said adjustment.

16. The method of controlling the speed of the output of a V-belt drive of claim 7 wherein said step of determining the rotational speed of the driver pulley comprises a step of providing a speed voltage signal propor-